(12) United States Patent
Scollard et al.

(10) Patent No.: US 6,334,242 B1
(45) Date of Patent: Jan. 1, 2002

(54) FUEL RAIL TO INTAKE MANIFOLD MOUNTING CLIP

(75) Inventors: Joseph E. Scollard, Suffolk; Stephen C. Bugos, Newport News, both of VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/536,630

(22) Filed: Mar. 28, 2000

Related U.S. Application Data

(60) Provisional application No. 60/148,387, filed on Aug. 11, 1999.

(51) Int. Cl.[7] ................................................ F16M 13/00
(52) U.S. Cl. ...................... 24/459; 248/316.7; 248/74.2
(58) Field of Search .......................... 24/459, 462, 293, 24/294, 295; 248/74.2, 68.1, 316.1, 316.6, 316.7, 229.1, 229.16, 229.2, 229.26; 123/469

(56) References Cited

U.S. PATENT DOCUMENTS

| | | | |
|---|---|---|---|
| 5,121,894 A | * | 6/1992 | Twork, Sr. et al. ...... 248/316.7 |
| 5,921,520 A | * | 7/1999 | Wisniewski .............. 248/316.1 |
| 6,062,516 A | * | 5/2000 | Rizzo et al. ................ 248/74.2 |

* cited by examiner

Primary Examiner—Robert J. Sandy

(57) ABSTRACT

A clip for mounting a fuel rail to an internal combustion engine is disclosed. The fuel rail has an outer surface and a projection on the outer surface. The engine has a retaining feature. The clip includes a body extending in a plane and first, second, and third pairs of rail legs extending from the body generally perpendicular to the plane. The second pair of rail legs is generally aligned with and disposed from a respective one of the first pair of rail legs by a predetermined distance. The third pair of rail legs is located distal from the first and second pairs of rail legs. Each of the third pair of rail legs is generally aligned with a respective one of the first pair of rail legs. A free end of each of the pairs of rail legs includes a generally concave surface juxtaposed from and biased toward the other leg of each of the first, second, and third pairs of rail legs. The clip further includes a pair of mounting legs extending from the body generally perpendicular to the plane. Each concave surface of the mounting legs are mountable to the outer surface of the fuel rail. The projection on the outer surface of the fuel rail is locatable between the first and second pair of rail legs. The mounting legs are insertable into the retaining feature such that the clip limits transverse and axial movement of the fuel rail relative to the internal combustion engine.

12 Claims, 4 Drawing Sheets

FUEL RAIL TO INTAKE MANIFOLD MOUNTING CLIP

CROSS REFERENCE TO RELATED APPLICATIONS

This application claims the benefit of U.S. Provisional Application No. 60/148,387, filed Aug. 11, 1999.

FIELD OF THE INVENTION

The invention relates to mounting clips, and more particularly, to mounting clips which mount a fuel rail to an intake manifold of an internal combustion engine.

BACKGROUND OF THE INVENTION

A fuel rail assembly is used for supplying fuel to an internal combustion engine. The fuel rail assembly includes a fuel rail tube and fuel injectors which are each retained within fuel cups disposed on the fuel rail tube. In a known arrangement, the fuel rail assembly is mounted to the engine by fuel rail mounting brackets and mounting bolts. The fuel rail mounting brackets are secured to the fuel rail tube by an established manufacturing process such as brazing. This mounting and brazing process is relatively time-consuming and expensive on a production line.

It would be beneficial to provide a fuel rail to intake manifold mounting clip which can mount the fuel rail to the engine in a single step, without the need for mounting bolts or other types of mechanical fasteners or brazing.

SUMMARY OF THE INVENTION

Briefly, the preferred embodiment discloses a clip for mounting a fuel rail to an internal combustion engine. The fuel rail has an outer surface and a projection on the outer surface and the engine has a retaining feature. The clip comprises a body extending in a plane and a first pair of rail legs extending from the body generally perpendicular to the plane. A free end of each rail leg includes a concave surface juxtaposed from and biased toward the free end of the other rail leg. The clip further includes second rail leg extending from the body and generally aligned with and disposed from one of the first pair of rail legs by a predetermined distance. A free end of the second rail leg includes a generally concave surface mountable to outer surface of the fuel rail. The clip further includes at least one mounting leg extending from the body. The concave surface of each of the first pair of rail legs and the second rail leg are mountable to the outer surface of a fuel rail. The projection is disposed between the first pair of rail legs and the second rail leg, and the at least one mounting leg is insertable into the retaining feature, such that the clip limits transverse movement of the fuel rail relative to the internal combustion engine.

The preferred embodiment also discloses a clip for mounting a fuel rail to an internal combustion engine. The fuel rail has an outer surface and a projection on the outer surface and the engine having a retaining feature. The clip comprises a body extending in a plane, three pairs of rail legs and a pair of mounting legs. A first pair of rail legs includes each rail leg extending from the body generally perpendicular to the plane. A second pair of rail legs extends from the body and generally aligned with and disposed from a respective one of the first pair of rail legs by a predetermined distance. A third pair of rail legs extends from the body at a location distal from the first and second pairs of rail legs. Each of the third pair of rail legs is generally aligned with a respective one of the first pair of rail legs. A free end of each leg in each of the first, second, and third pairs of rail legs includes a generally concave surface juxtaposed from and biased toward the other leg of each of the first, second, and third pairs of rail legs. The pair of mounting legs extends from the body generally perpendicular to the plane. Each concave surface is mountable to the outer surface of the fuel rail. The projection on the outer surface of the fuel rail is locatable between the first and second pair of rail legs and the mounting legs are insertable into the retaining feature such that the clip limits transverse and axial movement of the fuel rail relative to the internal combustion engine.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain features of the invention. In the drawings.

DETAILED DESCRIPTION OF THE PREFERRED EMBODIMENT

Figure 2:
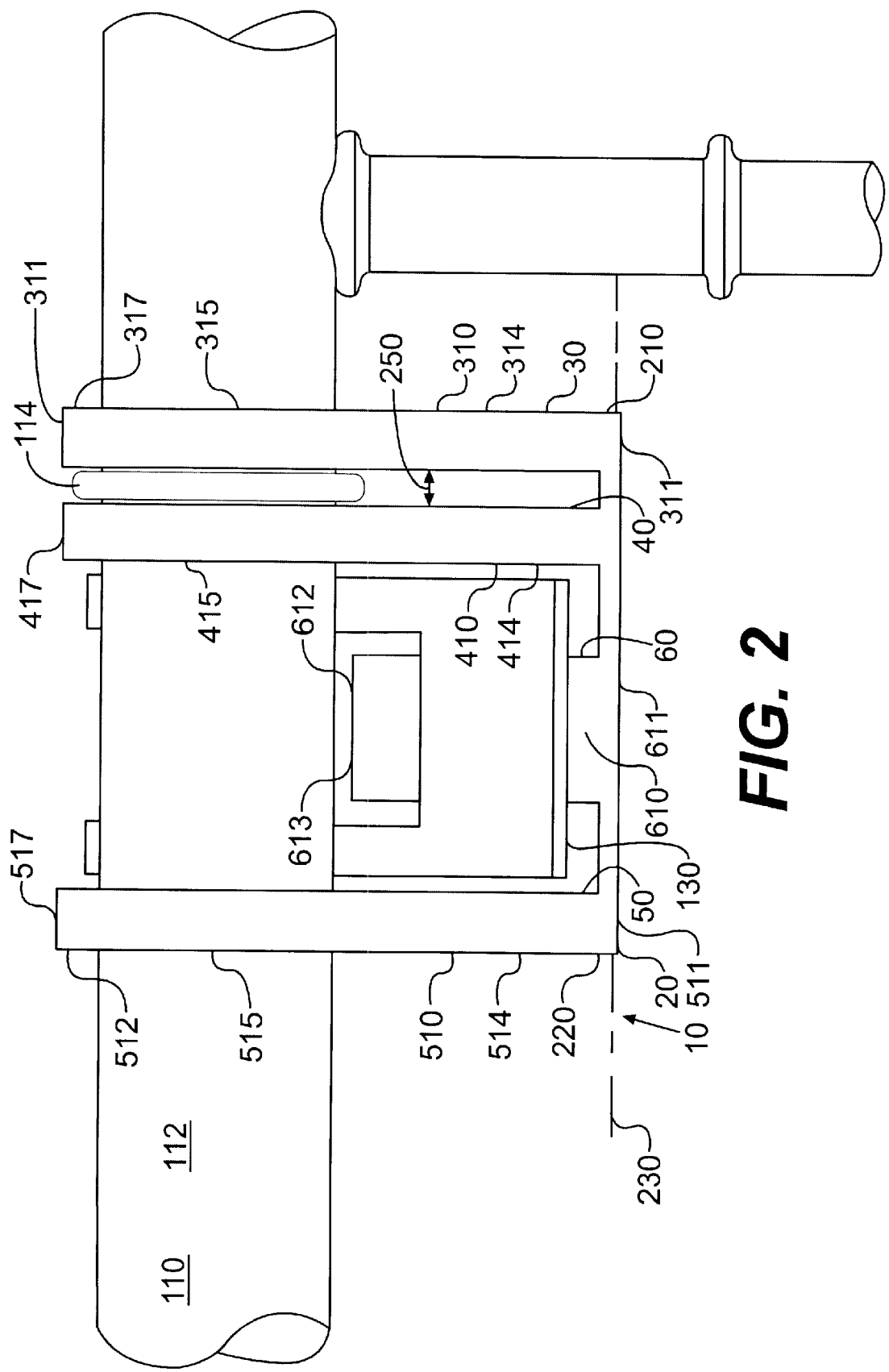
FIG. 2 is a top plan view of the clip according to the preferred embodiment connecting a fuel rail to an internal combustion engine.
Figure 3:
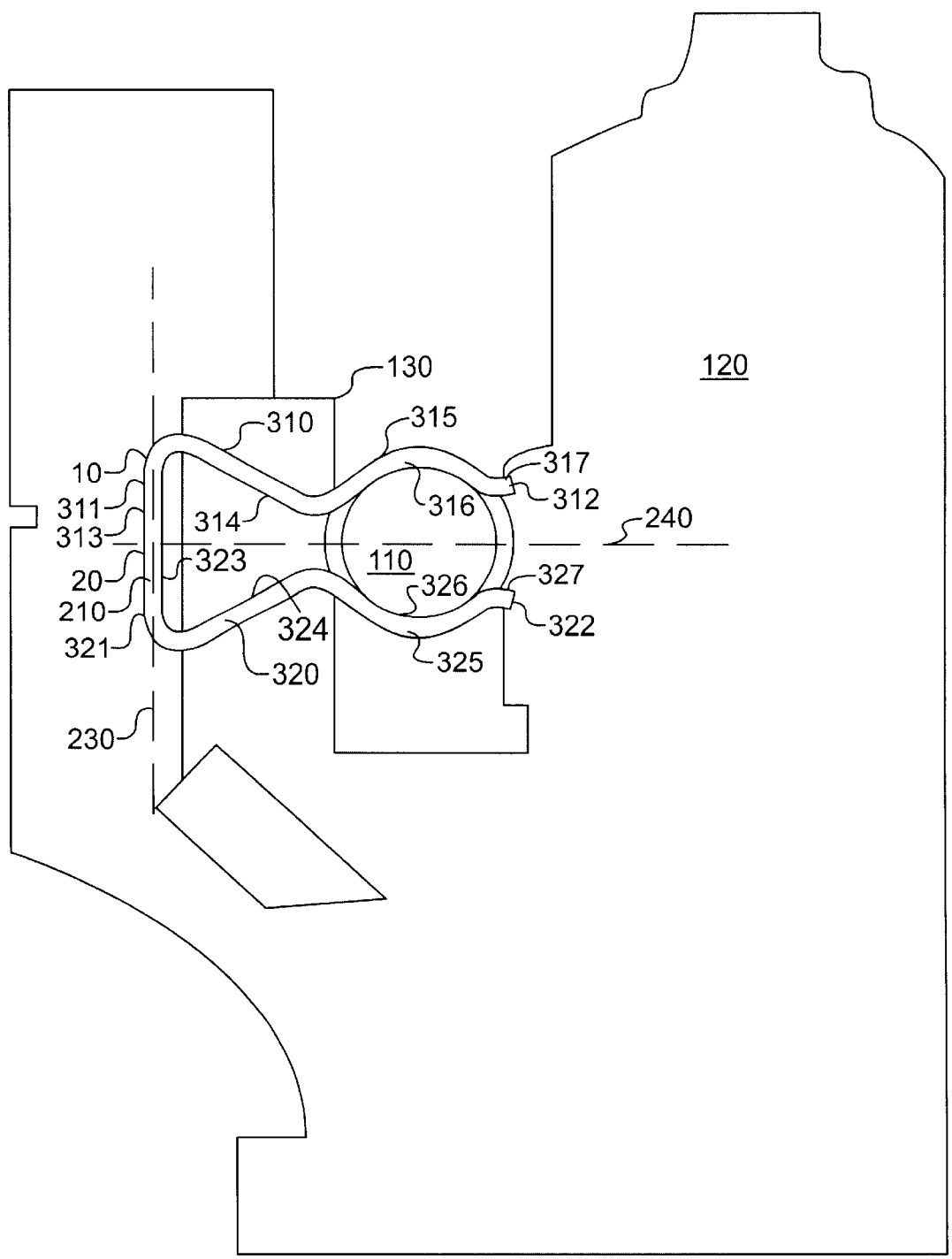
FIG. 3 is a side view of the clip according to the preferred embodiment connecting the fuel rail to the internal combustion engine.
Figure 4:
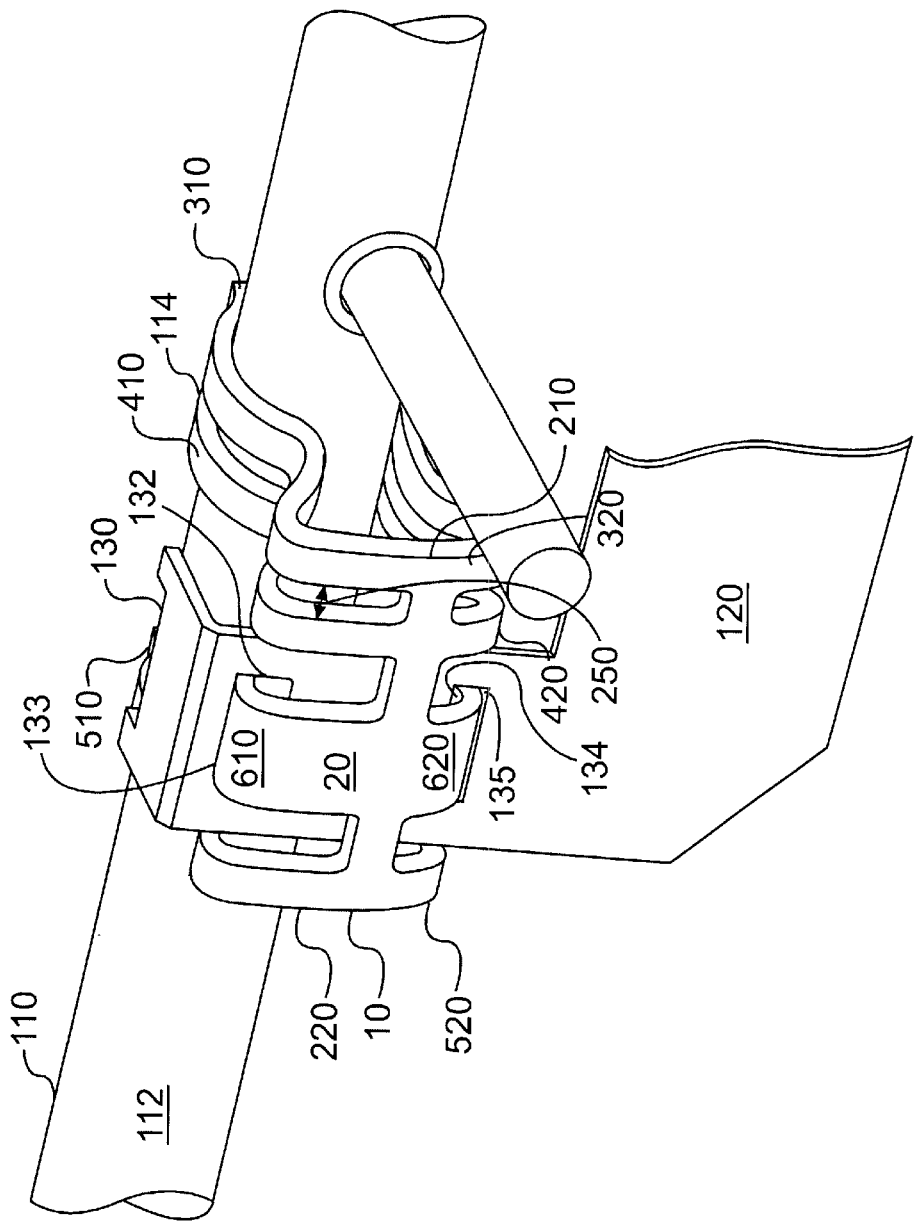
FIG. 4 is a perspective view of the clip according to the preferred embodiment connecting the fuel rail to the internal combustion engine.

In the drawings, like numerals are used to indicate like elements throughout. A mounting clip 10 according to the preferred embodiment is shown in FIGS. 1–4, with FIGS. 2–4 showing the mounting clip 10 (hereinafter "clip 10") for mounting a fuel rail 110 to an internal combustion engine 120. The fuel rail 110 includes an outer surface 112 and a projection 114. Preferably, the projection 114 is a continuous bead around the outer surface 112 of the fuel rail 110, although those skilled in the art will recognize that the projection 114 can be other configurations as well. The engine 120 includes an intake manifold retaining feature or retainer 130 for accepting and retaining a portion of the clip 10. However, those skilled in the art will recognize that the retainer 130 can be mounted on other portions of the engine 120 besides the air intake manifold. The retainer preferably includes a first opening 132 and a second opening 134, although those skilled in the art will recognize that the first opening 132 and the second opening 134 can be combined to form a single opening.

The mounting clip 10 is preferably formed from a single unitary sheet of metal, although those skilled in the art will recognize that the mounting clip 10 can be formed from multiple separate pieces connected together to form a single piece and/or can be constructed from a material other than metal.

The mounting clip 10 includes a body 20 which extends generally along a body plane 210 extending from top to bottom and out of the plane of the paper in FIG. 3. A generally transverse plane 220 extends perpendicular to the body plane 210 and extends from left to right and out of the plane of the paper of FIG. 3.

Figure 1:
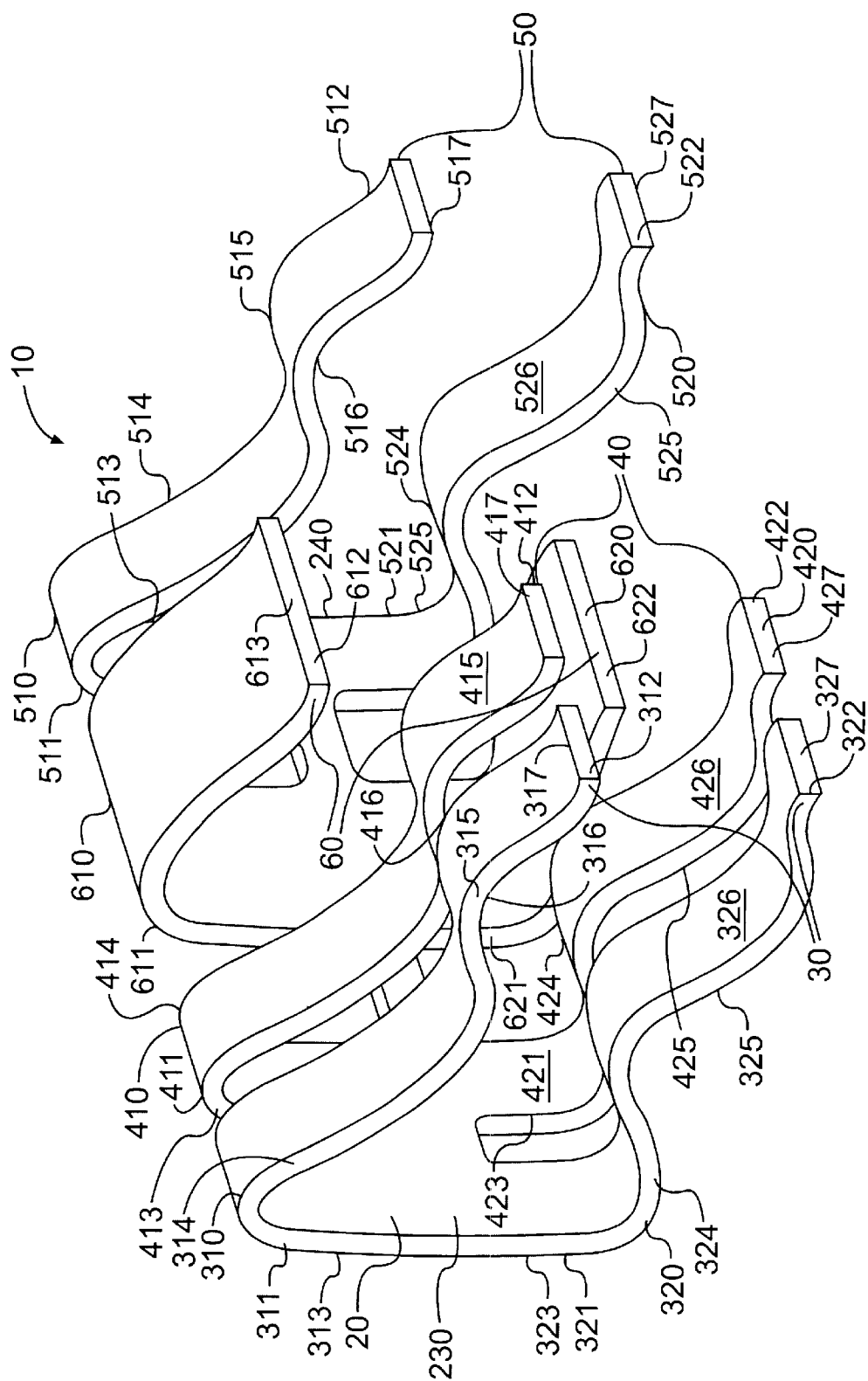
FIG. 1 is a perspective view of the fuel clip of the preferred embodiment.

Referring now to FIG. 1, the body 20 includes a first end 230 and a second end 240, distal from the first end 230.

Three pairs of preferably identical rail legs 30, 40, 50 extend from the body 20 on the same side of the body plane 210. The first pair of rail legs 30 extends from the body 20, generally perpendicular to the body plane 210 at the first end of the body 230. The first pair of rail legs 30 includes a first leg 310 and a second leg 320. The first leg 310 includes a connecting end 311 which connects the first leg 310 to the body 20, and a free end 312 which is distal from the body 20. The connecting end 311 includes a generally coplanar portion 313 which extends along the body plane 210 on one side of the perpendicular plane 220. An intermediate portion 314, connected to the coplanar portion 313, extends generally away from the body plane 210 and toward the perpendicular plane 220. The free end 312 includes a generally arcuate portion 315 which is connected to the intermediate portion 314. The arcuate portion 315 includes a generally concave surface 316 relative to the perpendicular plane 220. The extreme end of the free end 312 includes a lip portion 317 connected to the generally arcuate portion 315.

The second leg 320 of the first pair of legs 330 is preferably a mirror image of the first leg 310 across the perpendicular plane 220. The second leg 320 includes a connecting end 321 and a free end 322 which are located across the perpendicular plane 220 from the connecting end 311 and the free end 312 of the first leg 310, respectively. The second leg 320 also includes, from the connecting end 321 to the free end 322: a coplanar portion 323, an intermediate portion 324, an arcuate portion 325 having a generally concave surface 326 and a lip portion 327. The respective free ends 312, 322 are juxtaposed from each other across the perpendicular plane 220. Additionally, the free ends 312, 322 are generally biased toward the perpendicular plane 220 and each other by the respective intermediate portions 314, 324.

As shown in FIG. 1, a second pair of rail legs 40 is generally aligned with the first pair of rail legs 30 proximate to the first end 230. The second pair of rail legs 40 extends from the body 20, generally perpendicular to the body plane 210 between the first end 230 of the body 20 and the second end 240 of the body 20. The first and second pairs of rail legs 30, 40 respectively, are disposed from each other by a pre-determined distance or space 250. Preferably, the space 250 is slightly larger than a width of the projection 114 on the outer surface 112 of the fuel rail 110 to enable the first pair of rail legs 30 to engage the fuel rail 110 on one side of the projection 114 and the second pair of rail legs 40 to engage the fuel rail 110 on a distal side of the projection 114, as will be described in more detail later herein.

The second pair of rail legs 40 includes a first leg 410 and a second leg 420. The first leg 410 includes a connecting end 411 and a free end 412 having a coplanar portion 413, an intermediate portion 414, an arcuate portion 415 having a generally concave surface 416 and a lip portion 417 which are generally aligned with the respective corresponding elements of the first leg 310. Additionally, the second leg 420 includes a connecting end 421 and a free end 422 having a coplanar portion 423, an intermediate portion 424, an arcuate portion 425 having a generally concave surface 426 and a lip portion 427 which are generally aligned with the respective corresponding portions of the second leg 320 of the first pair 30, and across the perpendicular plane 220 from the corresponding elements of the first leg 410. The respective free ends 412, 422 are juxtaposed from each other across the perpendicular plane 220. Additionally, the free ends 412, 422 are generally biased toward the perpendicular plane 220 and each other by the respective intermediate portions 414, 424.

The third pair of rail legs 50 extends from the body 20, generally perpendicular to the body plane 210 at the second end 240 of the body 20. The third pair of rail legs 50 includes a first leg 510 and a second leg 520. The first leg 510 includes a connecting end 511 and a free end 512 which have a coplanar portion 513, an intermediate portion 514, an arcuate portion 515 having a generally concave surface 516, and a lip portion 517 which are aligned with the respective corresponding elements of the first leg 310 of the first pair of rail legs 30. The second rail leg 520 of the third pair 50 includes a connecting end 521 and a free end 522 having a coplanar portion 523, an intermediate portion 524, an arcuate portion 525 having a generally concave surface 526 and a lip portion 527 which are generally aligned with corresponding elements of the second leg 320 of the first pair 30, and across the perpendicular plane 220 from the corresponding elements of the first leg 510. The respective free ends 512, 522 are juxtaposed from each other across the perpendicular plane 220. Additionally, the free ends 512, 522 are generally biased toward the perpendicular plane 220 and each other by the respective intermediate portions 514, 524.

Preferably, the rail legs 310/320, 410/420, 510/520 in each rail leg pair 30, 40, 50, respectively, are spaced apart from each other sufficiently to frictionally engage the outer surface 112 of the fuel rail 110 along each respective concave surface 316/326, 416/426, 516/526 when the clip 10 is inserted over the fuel leg 110 as will be described later herein.

A pair of engine mounting legs 60 extends from the body 20 between the second pair of rail legs 40 and the third pair of rail legs 50. Preferably, the pair of mounting legs 60 extends from the body 20 on the same side of the body plane 210 as the rail leg pairs 30, 40, 50, although those skilled in the art will recognize that the pair of mounting legs 60 can extend from the body 20 on the other side of the body plane 210. The first pair of mounting legs 60 includes a first mounting leg 610 and a second mounting leg 620. The first mounting leg 610 extends from the body 20 generally parallel to and on one side of the perpendicular plane 220. The first mounting leg 610 includes a connected end 611 which is connected to the body 20 and a free end 612, distal from the body 220. The most distal portion of the free end 612 includes a lip 613 for purposes which will be described herein. A width of the first mounting leg 610 is preferably slightly smaller than a width of the first retainer opening 132 to enable the first mounting leg 610 to be inserted into the first retainer opening 132, leaving little room for the clip 10 to axially translate with respect to the retainer 130. As used herein, the term "axially" means "along the length of the fuel rail 110".

The second mounting leg 620 extends from the body 20 generally parallel to and on an opposite side of the perpendicular plane 220 from the first mounting leg 610. The second mounting leg 620 includes a connected end 621 connected to the body 20 and a free end 622, distal from the body 20. A width of the second mounting leg 620 is preferably slightly smaller than a width of the second retainer opening 134 to enable the second mounting leg 620 to be inserted into the second retainer opening 134, leaving little room for the clip 10 to axially translate with respect to the retainer 130.

The free ends 612, 622 of the first and second mounting legs 610, 620, respectively, are juxtaposed from and biased away from each other so that, when the first mounting leg 610 is inserted into the first opening 132 and the second mounting leg 620 is inserted into the second opening 134, the free ends 612, 622 each frictionally engage a top wall 133 in the first opening 132 and a bottom wall 135 in the second opening 134, as will be described later herein.

To install the clip 10, the clip 10 is aligned with the fuel rail 110 and the retainer 130 on the engine 120 such that the free end 612 and the lip 613 on the first mounting leg 610 can be inserted into the first opening 132 on the retainer 130, and the free end 622 on the second mounting 620 can be inserted into the second opening 134 on the retainer 130. The free ends 612, 622 of each mounting leg 610, 620, respectively, must preferably be biased toward each other by an outside force, such as a tool or an installer, to enable the free ends 612, 622 to each enter the respective opening 132, 134. The mounting legs 610, 620 are moved in a transverse direction into the first opening 132 and second opening 134, respectively. As used herein, the term "transversely" means "across the length of the fuel rail 110". After the lip 613 clears the first opening 132 and the free end 622 clears the second opening 134 (i.e., the lip 613 and the free end 622 are between the openings 132, 134 and the fuel rail 110), the outside force is released from the pair of mounting legs 60, allowing the first and second mounting legs 610, 620 to bias away from each other, frictionally engaging the first leg 610 to the upper wall 133 of the first opening 132, and frictionally engaging the second leg 620 to the lower wall 135 of the second opening 134, securing the clip 10 to the retainer 130.

Simultaneously, the lip portions 317, 327, 417, 427, 517, 527 engage the outer surface 112 of the fuel rail 110. The projection 114 is located so as to be positioned within the predetermined space 250 between the first and second pairs of rail legs 30, 40. As the clip 10 is pressed against the outer surface 112 in the transverse direction, the lip portions 317, 327, 417, 427, 517, 527 are forced away from the perpendicular plane 220. After the lip portions 317, 417, 517 are separated from the lip portions 327, 427, 527, respectively by the outside diameter of the fuel rail 110, as the clip 10 is still being moved in the transverse direction (i.e. the lip portions 317, 417, 517 pass the top of the fuel rail 110 and the lip portions 327, 427, 527 pass the bottom of the fuel rail 110), the biasing action of the rail legs 310, 410, 510 toward the rail legs 320, 420, 520 force the lip portions 317, 417, 517 toward the respective lip portions 327, 427, 527, allowing the concave surfaces 316, 326, 416, 426, 516, 526 to mount and engage the outer surface 112 of the fuel rail 110, securing the clip 10 to the fuel rail 110.

The biasing action of the rail legs 310, 320, 410, 420, 510, 520 against the fuel rail 110 and the mounting legs 610, 620 against the retainer 130 significantly limit any transverse movement of the fuel rail 110 with respect to the engine 120. The engagement of the projection 114 in the predetermined space 250 between the first and second rail leg pairs 30, 40 significantly limits any axial movement of the fuel rail 110 with respect to the engine 120.

Although the three pair of rail legs 30, 40, 50 are preferred, those skilled in the art will recognize that a clip can be used that includes only the first pair of rail legs 30 and the first leg 410 of the second pair of rail legs 40 to engage the fuel rail 110 on either side of the projection 114, respectively, to limit axial movement of the fuel rail 110 with respect to the engine 120, and/or that also includes only the first mounting leg 610 to limit transverse movement of the fuel rail with respect to the engine 120. The inclusion of the second rail leg 420 of the second pair 40, the third pair of rail legs 50, and/or the second mounting leg 620 provide additional capability to the clip 10 to further limit axial and transverse movement of the fuel rail 110 with respect to the engine 120.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined in the appended claims.

What is claimed is:

1. A clip for mounting a fuel rail to an internal combustion engine, the fuel rail having an outer surface and a projection on the outer surface and the engine having a retaining feature, the clip comprising:

a body extending in a plane;

a first pair of rail legs, each rail leg extending from the body generally perpendicular to the plane, a free end of each rail leg including a concave surface juxtaposed from and biased toward the free end of the other rail leg;

a second rail leg extending from the body and generally aligned with and disposed from one of the first pair of rail legs by a predetermined distance, a free end of the second rail leg including a generally concave surface mountable to the outer surface of the fuel rail;

a third rail leg extending from the body and combined with the second rail leg to form a second rail leg pair, the third rail leg being generally aligned with and disposed from the other of the first pair of rail legs by the predetermined distance, a free end of the third rail leg including a generally concave surface, the concave surfaces of the second and third rail legs being juxtaposed from and biased toward each other, the concave surface of the third rail leg being mountable to the outer surface of the fuel rail, such that the clip further limits transverse and axial movement of the fuel rail relative to the internal combustion engine, the first and second pairs of rail legs are disposed proximate to a first end of the body, the clip further including a third pair of rail legs extending from the body proximate to a second end of the body, distal from the first end, each of the third pair of rail legs being generally aligned with a separate one of the first pair of rail legs, a free end of each of the third pair of rail legs including a concave surface juxtaposed from and biased toward each other, the concave surface of each of the third pair of rail legs being mountable to the outer surface of the fuel rail; and at least one mounting leg extending from the body, wherein the concave surface of each of the first pair of rail legs and the second rail leg are mountable to the outer surface of the fuel rail, the projection being disposed between the first pair of rail legs and the second rail leg, and the at least one mounting leg is insertable into the retaining feature, such that the clip limits transverse movement of the fuel rail relative to the internal combustion engine.

2. A clip for mounting a fuel rail to an internal combustion engine, the fuel rail having an outer surface and a projection on the outer surface and the engine having a retaining feature, the clip comprising:

a body extending in a plane;

a first pair of rail legs, each rail leg extending from the body generally perpendicular to the plane, a free end of each rail leg including a concave surface juxtaposed from and biased toward the free end of the other rail leg;

a second rail leg extending from the body and generally aligned with and disposed from one of the first pair of rail legs by a predetermined distance, a free end of the second rail leg including a generally concave surface mountable to outer surface of the fuel rail;

a second mounting leg extending from the body, the second mounting leg being insertable into the retaining feature, a free end of each of the first and second mounting legs being juxtaposed from and biased away from each other; and at least one mounting leg extending from the body, wherein the concave surface of each of the first pair of rail legs and the second rail leg are mountable to the outer surface of a fuel rail, the projection being disposed between the first pair of rail legs and the second rail leg, and the at least one mounting leg is insertable into the retaining feature, such that the clip limits transverse movement of the fuel rail relative to the internal combustion engine.

3. The clip according to claim 2, wherein the clip is constructed from a metal.

4. The clip according to claim 3, wherein the clip is formed from a single unitary sheet.

5. A clip for mounting a fuel rail to an internal combustion engine, the fuel rail having an outer surface and a projection on the outer surface and the engine having a retaining feature, the clip comprising:

a body extending in a plane;

a first pair of rail legs, each rail leg extending from the body generally perpendicular to the plane;

a second pair of rail legs extending from the body and generally aligned with and disposed from a respective one of the first pair of rail legs by a predetermined distance;

a third pair of rail legs extending from the body at a location distal from the first and second pairs of rail legs, each of the third pair of rail legs being generally aligned with a respective one of the first pair of rail legs, a free end of each leg in each of the first, second, and third pairs of rail legs including a generally concave surface juxtaposed from and biased toward the other leg of each of the first, second, and third pairs of rail legs; and a pair of mounting legs extending from the body generally perpendicular to the plane, each concave surface being mountable to the outer surface of the fuel rail, the projection on the outer surface of the fuel rail being locatable between the first and second pair of rail legs and the mounting legs being insertable into the retaining feature such that the clip limits transverse and axial movement of the fuel rail relative to the internal combustion engine.

6. The clip according to claim 5, wherein the clip is constructed from a metal.

7. The clip according to claim 6, wherein the clip is formed from a single unitary sheet.

8. A method of connecting a fuel rail to an engine with a clip, the fuel rail including an outer surface having a projection, the engine including a retaining feature, the clip including a body extending in a plane; a first pair of rail legs, each rail leg extending from the body generally perpendicular to the plane, a free end of each rail leg including a concave surface juxtaposed from and biased toward the free end of the other rail leg; a second rail leg extending from the body and generally aligned with and disposed from one of the first pair of rail legs by a predetermined distance, a free end of the second rail leg including a generally concave surface mountable to the outer surface of the fuel rail; and at least one mounting leg extending from the body, the method comprising the steps of:

inserting the concave surfaces of the first pair of rail legs and the second rail leg over the fuel rail, the projection being located between the first pair of rail legs and the second rail leg, each of the first pair of rail legs and the second rail leg being biased against the outer surface of the fuel rail; and inserting the mounting leg into the retaining feature, the mounting leg being biased against the retaining feature, the clip limiting axial and transverse movement of the fuel rail with respect to the engine.

9. The method according to claim 8, wherein the clip further includes a third rail leg extending from the body and combined with the second rail leg to form a second rail leg pair, the third rail leg being generally aligned with and disposed from the other of the first pair of rail legs by the predetermined distance, a free end of the third rail leg including a generally concave surface, the concave surfaces of the second and third rail legs being juxtaposed from and biased toward each other, the concave surface of the third rail leg being mountable to the outer surface of the fuel rail, the method further comprising the step of:

inserting the concave surface of the third rail leg over the fuel rail, the third rail leg being biased against the outer surface of the fuel rail, the clip further limiting axial and transverse movement of the fuel rail with respect to the engine.

10. The method according to claim 9, wherein the clip further includes the first and second pairs of rail legs disposed proximate to a first end of the body, the clip further including a third pair of rail legs extending from the body proximate to a second end of the body, distal from the first end, each of the third pair of rail legs being generally aligned with a separate one of the first pair of rail legs, a free end of each of the third pair of rail legs including a concave surface juxtaposed from and biased toward each other, the method further comprising the step of:

inserting the concave surface of the third rail leg pair over the fuel rail, the third rail leg pair being biased against the outer surface of the fuel rail, the clip further limiting axial and transverse movement of the fuel rail with respect to the engine.

11. The method according to claim 8, wherein the clip further includes a second mounting leg extending from the body, the second mounting leg being insertable into the retaining feature, a free end of each of the first and second mounting legs being juxtaposed from and biased away from each other, the method further comprising the step of:

inserting the second mounting leg into the retaining feature, the clip further limiting transverse movement of the fuel rail relative to the internal combustion engine.

12. A method of connecting a fuel rail to an engine with a clip, the fuel rail including an outer surface having a projection, the engine including a retaining feature, the clip including a body; a first pair of rail legs, each rail leg extending from the body, a free end of each rail leg including a concave surface juxtaposed from and biased toward the other rail leg; a second rail leg extending from the body and generally aligned with and disposed from one of the first pair of rail legs by a predetermined distance, the second rail leg including a generally concave surface mountable to outer surface of the fuel rail; and at least one mounting leg extending from the body, the method comprising the steps of:

inserting the concave surfaces of the first pair of rail legs and the second rail leg over the fuel rail, the projection being located between the first pair of rail legs and the second rail leg, each of the first pair of rail legs and the second rail leg being biased against the outer surface of the fuel rail; and inserting the mounting leg into the retaining feature, the mounting leg being biased against the retaining feature, the clip limiting axial and transverse movement of the fuel rail with respect to the engine.

\* \* \* \* \*